Oct. 7, 1969
M. E. GRIMES
3,470,631
FLOATING HITCH CONSTRUCTION
Filed Oct. 25, 1967
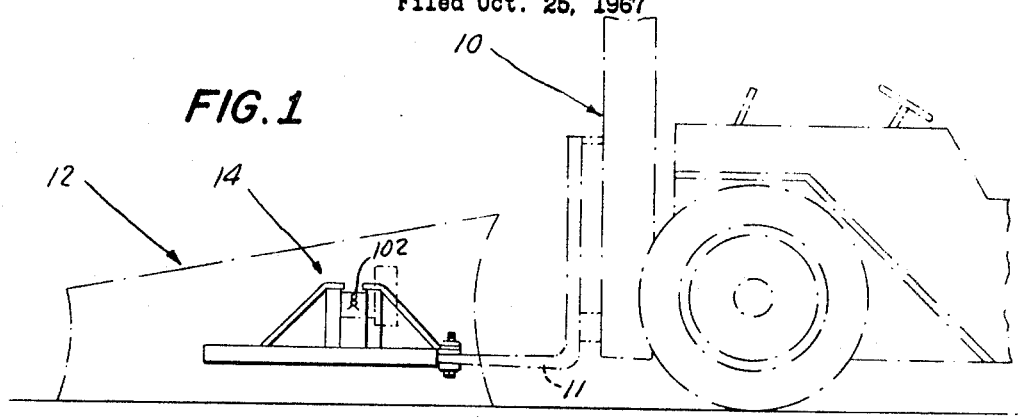
FIG. 1
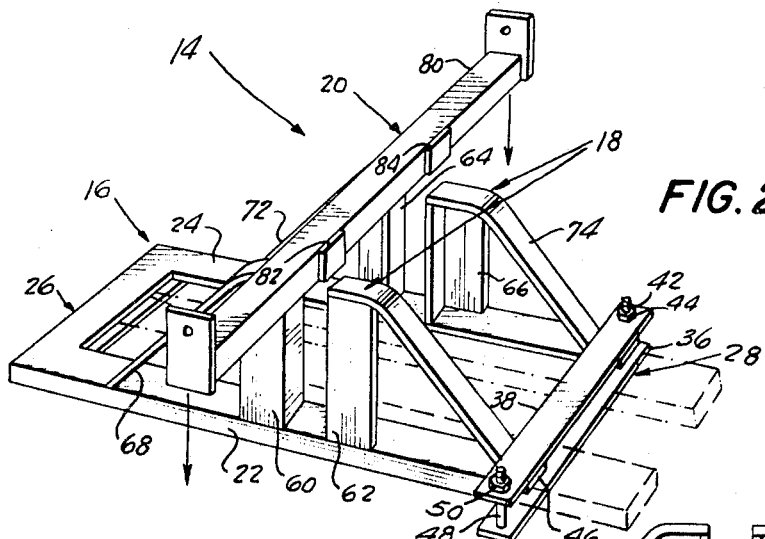
FIG. 2
FIG. 4
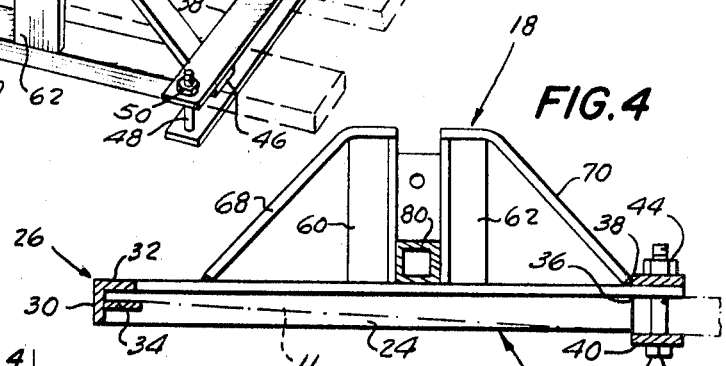
FIG. 3
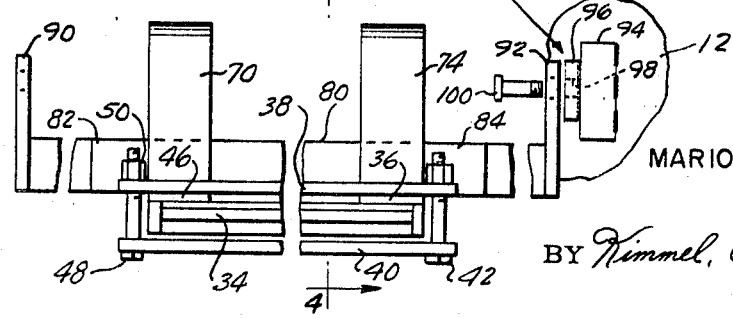
INVENTOR
MARION E. GRIMES
BY *Kimmel, Crowell & Weaver.*
ATTORNEYS 3,470,631
FLOATING HITCH CONSTRUCTION
Marion E. Grimes, 758 N. Ohio St.,
Greenville, Ohio 45331
Filed Oct. 25, 1967, Ser. No. 678,085
Int. Cl. E01h 5/04; B60r 11/00; B60p 9/00
U.S. Cl. 37—42          9 Claims

ABSTRACT OF THE DISCLOSURE

A floating hitch construction in combination with a snow removal plow and a self-powered lift truck having forks, the hitch comprising a rectangular platform which engages the tips of the forks and the clamps to the forks intermediate the ends thereof having two pairs of vertical upright posts between which a transverse floating bar pivotally secured at either end to the blade for transmitting force from the lift truck to the blade is disclosed.

BACKGROUND OF THE INVENTION

Field of the invention

This invention relates to self-propelled land vehicles especially adapted for snow removal and more particularly to means for securing a snow blade to a conventional land vehicle such as a lift truck.

Description of the prior art

Snow removal equipment is well known in the prior art. Certain types of snow removal equipment are constructed particularly to remove the snow and have little other utility. Such devices are often highly efficient and serve a necessary and desirable function. It is, however, desirable to be able to secure a snow removal blade to a land vehicle which has other uses. Means for securing snow blades to trucks and automobiles and tractors are known in the prior art. However, means especially adapted for securing a snow removal blade to a lift truck of the type which has a plurality of load supporting forks have not heretofore been disclosed. It is, accordingly, an object of this invention to provide means for constructing a combination lift truck and snow removal blade and more particularly the invention is directed to a floating hitch construction for securing a snow blade to a lift truck.

SUMMARY

Without intending to limit the invention, the present invention may be briefly described as a generally rectangular platform which is constructed and adapted to engage the tips of the fork at one end and to be clamped at an intermediate point on the forks which has a pair of vertical upright posts on each of the side members of the platform which are braced by angularly disposed braces. A floating hitch bar is slidably received between the uprights and is pivotally secured to a snow blade to provide a floating arrangement for the snow blade when the snow blade is being pushed by a lift truck.

It is an object of the invention to provide a floating hitch for securing a snow blade to a lift truck.

A more specific object of the invention is the provision of a platform for being secured to a fork lift having vertical uprights which movably support a cross-beam which is pivotally secured to a snow blade which is shaped generally in a V.

A further object is the provision of a floating cross-beam secured pivotally at its ends to a V-shaped snow blade which is supported in a platform construction for vertical movement relative thereto.

The specific construction described herein constitutes an object of the invention.

Other objects of the invention will become apparent to those skilled in the art from the description which follows and from the drawings to which reference is made.

BRIEF DESCRIPTION OF THE DRAWINGS

FIGURE 1 is a side view showing the over-all combination, the V-shaped blade and the lift truck being shown in phantom lines to emphasize the hitch construction.

FIGURE 2 is an exploded perspective view of the hitch construction of this invention.

FIGURE 3 is an end view, from the front, partially cut to emphasize the constructional relation of the parts.

FIGURE 4 is a side view in cross-section taken substantially along lines 4—4 in the direction of the arrows as shown in FIGURE 3.

DETAILED DESCRIPTION OF THE PREFERRED EMBODIMENT

Referring first to FIGURE 1, the over-all combination of this invention includes a lift truck 10 which has a plurality of forks 11 extending from the front thereof. The lift truck and the forks are, of course, of conventional construction and may be of any desired size or model. The combination further includes a V-shaped snow blade of the type described in my co-pending application Ser. No. 577,239, filed Sept. 6, 1966. Such snow blades are commonly marketed under the registered trademark Sno-Vee. The other major component of the combination of this invention is the floating lift hitch shown generally at 14.

Referring to FIGURE 2, the floating lift hitch 14 is shown in detail. Other views of the floating hitch 14 are shown in FIGURES 3 and 4 to which reference will be made.

The major components of the floating hitch construction are, first, a generally flat platform portion 16 for being secured to the forks, a plurality of vertical uprights shown at 18 secured to the platform, an elongate crossbar 20 slidably received between the uprights for relative vertical movement and means such as shown at 22 in FIGURE 3 for securing the opposite end portions of the crossbar to the blade for supporting the blade and exerting a forward motion thereon as the lift truck is driven.

As best illustrated in FIGURE 2, the platform is generally rectangular in shape having side bars 22 and 24 and end portions 26 and 28. The front cross portion is adapted to be engaged by the tips of the forks and the rear cross portion is adapted to be secured by clamping to an intermediate portion of the forks.

As illustrated in FIGURE 4, the end portion 26 comprises an angle iron having lips 30 and 32, lip 32 being adapted to engage the top surface of the tip of the forks. A crossbar 34 is secured, such as by welding, along the end bar portion 30 and is spaced from the lip 32 to provide a gap for receiving the tips of the lift truck. The crossbar 34 is adapted to engage the lower surface of the tips of the forks.

The upper lip of side 24, shown at 36, rests along the length of the fork and is clamped thereon by a crossbar 38 extending on top of the forks and a crossbar 40 extending on the bottoms of the forks. The crossbars 38 and 40 are secured together by a bolt 42 and a nut 44 on one side. On the other side, the end of the side 22, shown at 46, is secured together by a bolt 48 and a nut 50. Thus, the rear cross portion includes means for engaging the upper surface of the forks, means for engaging the lower surface of the forks and means for clamping the upper and lower surface engaging means together on the forks to prevent dislodgement of the floating hitch from the forks.

The vertical construction 18, comprises two pairs of posts, posts 60 and 62 secured on the side 22 and posts 64 and 66 secured on the side 24. These posts are constructed and disposed on the side bars to movably support the crossbar construction 20 transversely of the platform. Angularly disposed braces shown at 68, 70, 72 and 74, extend from the top portion of each post to a point proximate an end of the platform to provide greater strength and rigidity.

As illustrated in FIGURE 2, the pairs of upright posts 60 and 62 and 64 and 66 are spaced apart to slidably receive the crossbar construction illustrated at 20. The crossbar construction includes an elongate bar 80 having two stops 82 and 84 and similar stops on the other side to prevent or limit transverse movement of the crossbar relative to the support means and to the forks and, consequently, to the fork lift. Since the crossbar rests between the posts it is free to move vertically, however.

As best illustrated in FIGURE 3, the means on the ends of the crossbar for securing the crossbar to the blade include a pair of upwardly extending arms 90 and 92 which are apertured and a bracket which includes a portion 94 which may be welded to the blade 12 and a rearwardly extending arm 96 having an aperture 98 which is adapted to be aligned with the aperture in the arm 92. A clevis pin 100 is adapted to extend through the apertures and to be held there by a clip 102, shown in FIGURE 1. Thus, the blade, preferably a V-shaped snow removal blade, is pivotally supported on the ends of the crossbar.

In use, it is merely necessary to slip the platform over the forks of the fork lift and tighten the nuts 44 and 50 to clamp it in place. The crossbar may be secured to the blade and all that is necessary is that the crossbar be lifted and slid down in between the vertical upright posts 60 and 62 and the posts 64 and 66. Thus, the blade floats in the bracket construction and is pivotally mounted. It will be apparent that the blade will then rest adjacent the surface to be cleaned. As is conventional, a roller or foot may be provided on the blade to lift the blade a fraction of an inch above the surface to be cleaned, if desired. The blade floats and pivots to adapt to the contour of the surface being cleaned. The importance of this latter action is worthy of note. Since the forks extend a substantial distance forwardly of the front wheels of the fork lift, they must be lifted up from the ground sufficiently to clear any obstacles which may be in the path and, in addition, must be lifted sufficient to clear the surface where there is a rather sharp curve. A rigid mounting of a snow blade on the tips of the forks would be most ineffective because it is impractical to maintain the tips of the fork a fixed distance above the surface, for the reasons previously mentioned. It is, at a minimum, necessary to provide for a pivotally mounted snow blade. But, this is not enough to provide efficient snow removal since, with the V-shaped blade, if the blade only pivots, there will be a tendency for only the point or only the rear portions to be in contact or proximate the surface to be cleaned. It is necessary, therefore, to provide for floating the entire blade to permit full adaptation of the blade to any surface.

It will be apparent from the foregoing that by the special floating construction illustrated, a fork lift may now be used conveniently and efficiently as well as effectively as a snow plow. It will also be apparent that the size of the bracket will be adapted, within the skill of one cognizant of the art, according to the size of the fork lift and the blade. Other adaptations will also be apparent to those skilled in the art.

While the invention has been disclosed, abstracted, and summarized with respect to a specific embodiment and a specific construction has been disclosed as exemplary of the invention, it will be realized that since many departures from the actual disclosure may be made that the invention is not limited by the specific embodiment but is intended to be limited only by the prior art and by the scope of the claims.

I claim:
1. In a combination which includes a snow removal blade and a self-powered lift truck of the type which includes forwardly extending lead supporting forks and means for supporting the blade on the forks, the improvement wherein the support means comprises:
   a generally flat platform portion for being secured to the forks;
   a plurality of vertical uprights secured to the platform;
   an elongate crossbar slidably received between the uprights for relative vertical movement; and
   means securing the opposite end portions of the crossbar to the blade for supporting the blade and exerting forward motion thereon.

2. The support means of claim 1 wherein the platform is generally rectangular in shape and has a front cross portion and a rear cross portion, the front cross portion being adapted to be engaged by the tip portions of the forks and the rear cross portion being adapted to be secured to an intermediate portion of the forks.

3. The support means of claim 2 wherein the front cross portion includes means for engaging the upper surface of the forks and means for engaging the lower surface of the forks.

4. The support means of claim 2 wherein the rear cross portion includes means for engaging the upper surface of the forks, means for engaging the lower surface of the forks and means for clamping said upper and lower surface engaging means together on said forks.

5. The support means of claim 4 wherein the front cross portion includes means for engaging the upper surface of the forks and means for engaging the lower surface of the forks.

6. The support means of claim 5 wherein the vertical uprights comprise two pairs of vertical posts, said pairs being secured, respectively, to the opposite sides of the platform intermediate the ends thereof and are constructed and disposed to movably support the crossbar transversely of the platform.

7. The support means of claim 6 further comprising angularly disposed braces extending from the top portion of each post to a point proximate an end of the platform.

8. The support means of claim 7 further comprising stop means secured on the crossbar for engaging the posts to limit transverse movement of the crossbar relative to the support means and the forks.

9. The support means of claim 8 wherein the means securing the ends of the crossbar to the blade comprise:
   a bracket secured to the blade; and
   means pivotally interconnecting the bracket and the respective end of the crossbar to permit the blade to float vertically and pivotally relative to the lift truck when the lift truck moves the blade forward.

References Cited

UNITED STATES PATENTS 2,584,240   2/1952   Stewart _____ 214—512

ROBERT E. PULFREY, Primary Examiner

EUGENE H. EICKHOLT, Assistant Examiner

U.S. Cl. X.R.

172—272, 801; 280—186